April 11, 1950     T. P. GLOVER     2,503,476
MACHINE FOR REMOVING BURRS FROM PUNCHED
OR DRILLED SHEETS OR PLATES Filed Jan. 8, 1945     5 Sheets-Sheet 1

Inventor
Thurmon P Glover
By: Fred Gerlach atty.

Inventor
Thurmon P. Glover
By: Fred Gerlach
Atty.

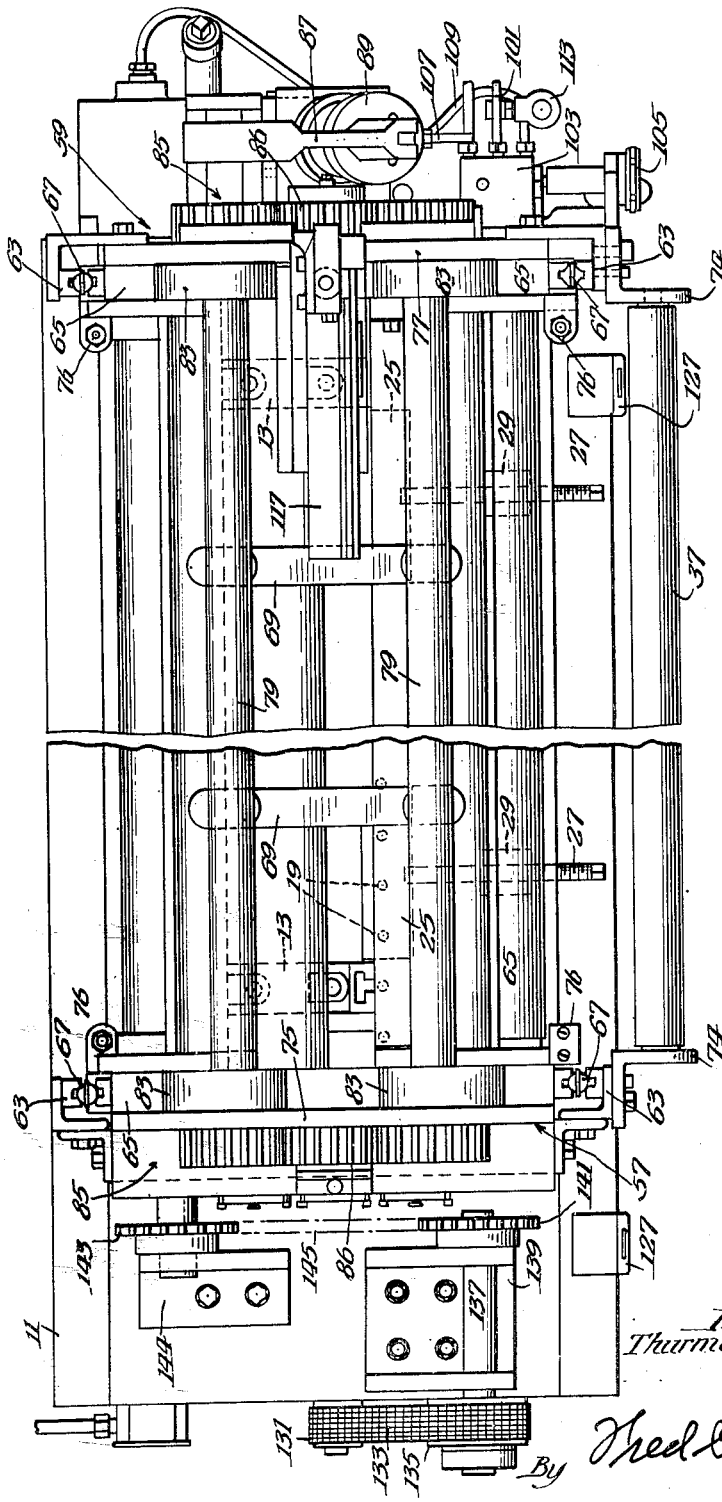

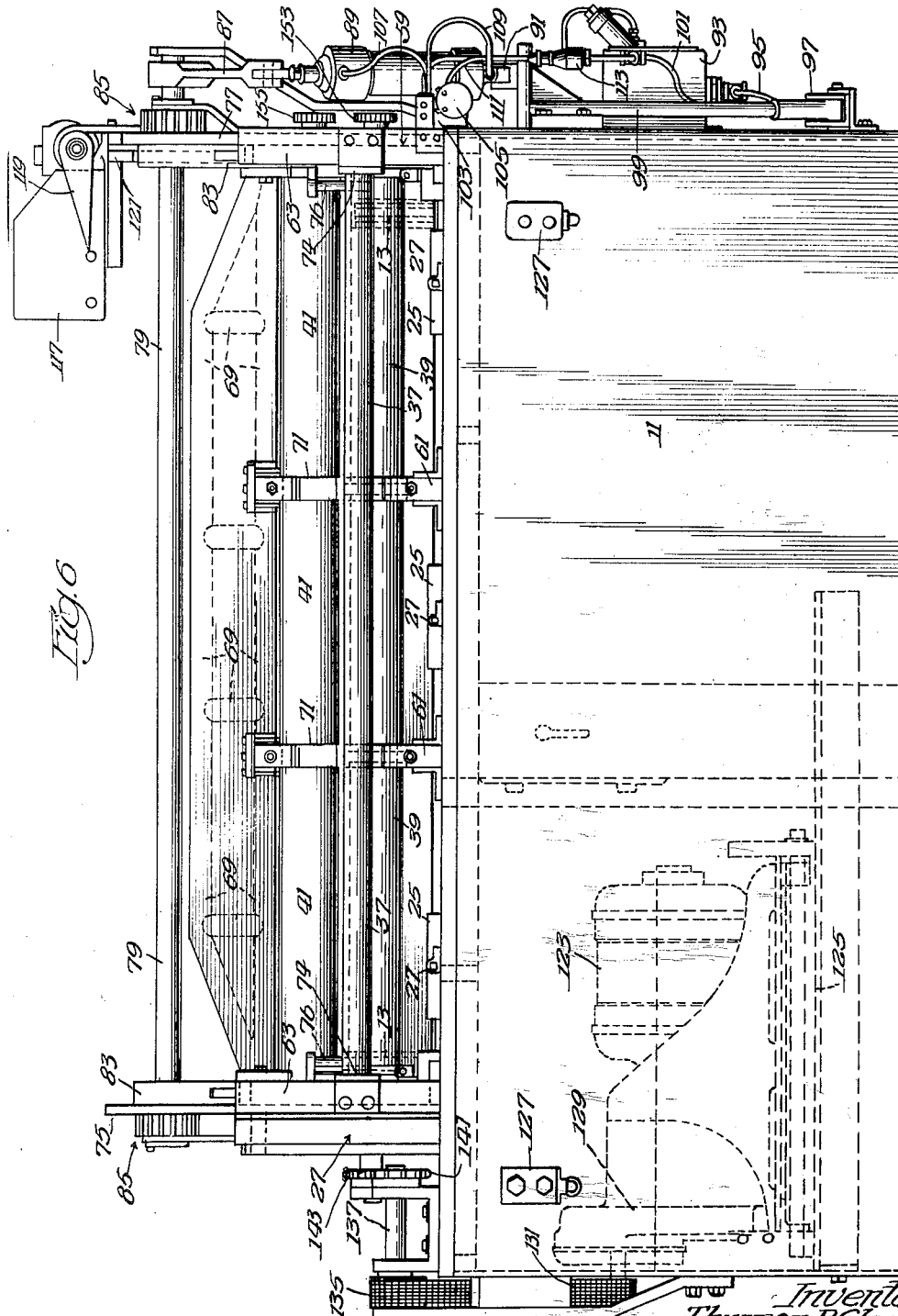

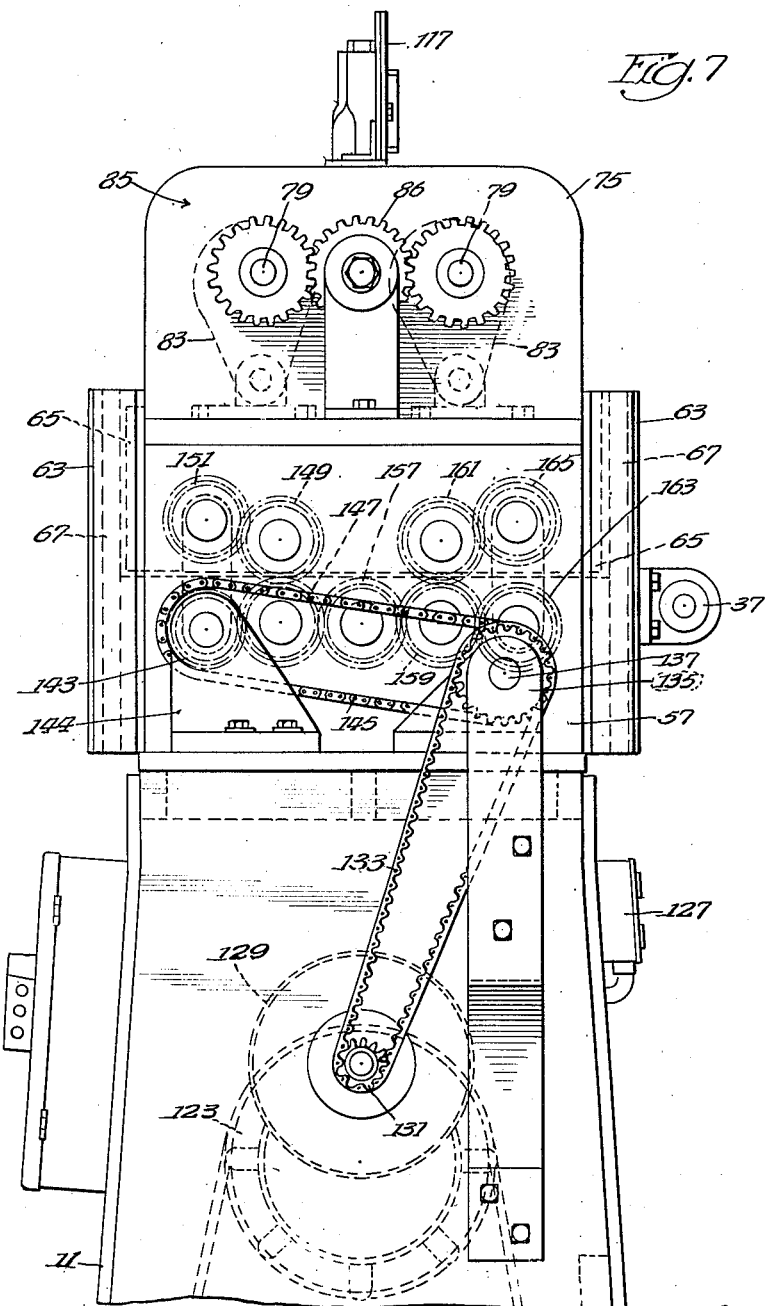

Patented Apr. 11, 1950

2,503,476

UNITED STATES PATENT OFFICE 2,503,476

MACHINE FOR REMOVING BURRS FROM PUNCHED OR DRILLED SHEETS OR PLATES

Thurmon P. Glover, San Diego, Calif., assignor to Consolidated Vultee Aircraft Corporation, San Diego, Calif., a corporation of Delaware Application January 8, 1945, Serial No. 571,908

8 Claims. (Cl. 164—38)

The present invention relates in general to the working of materials and has more particular reference to a burring machine, that is to say, a machine for removing burrs from a previously punched or drilled sheet of usually metallic material.

In modern manufacturing operations involving sheet material it is often necessary to preform the sheet with punched or drilled openings for the reception of fastening elements, such as rivets, bolts and the like, by which to fasten the sheet to other structural members in the manufacture of an assembled device of which the sheet may form a part. More particularly in the fabrication of aircraft, but also in the manufacture of other structures, including ships, automobiles, railroad cars and many other structures, devices and articles of commerce, is the practice of assembling and fastening together previously perforated plates an important phase of manufacturing operations.

A source of delay and consequent economic loss, in the utilization of sheet material of the character mentioned, is the necessity, in many cases, of carefully removing burrs and other irregularities, which occur in punched or drilled sheet material as a result of the perforating process, in order to condition the same for assembly in the finished product. Burrs formed at the edges of openings, particularly in sheet metal plates, form jagged projections comprising excess material forced from the body of the plate during the formation of punched or drilled openings therein, such projections occurring at the edges of such openings and comprising material integrated with and adhered to the sheet at the punched hole, and it is essential, in many cases, that such projecting burrs be removed and the opening neatly finished before a fastening member can be properly applied as a part of the assembly of the plate in the structure of which it is to form a part.

Heretofore, it has been necessary to have each opening, separately and individually, inspected and treated for burr removal, this being ordinarily accomplished by an operator equipped with a suitable hand cutting tool, the operator removing the burr by grinding, counter-sinking, or otherwise excising the burr. The process of individual burring treatment at each opening in a plate is exceedingly wasteful of time and effort, particularly where the plate being treated contains a large number of openings as is the case, for example, in thin sheet metal plates for use as the skin in aircraft. Furthermore, the burring operation requires appreciable skill and care on the part of the operator.

An important object of the present invention is to provide a suitable machine through which sheet material may be delivered rapidly for the removal of burrs; a further object being to provide a machine which will straighten plates delivered therethrough for burr removal, thereby accomplishing the dual function of straightening the plate and removing burrs as a single operation.

Another important object is to provide a burring and plate straightening device adapted for operation and supervision by a minimum number of unskilled workers to thereby minimize the economic losses, which presently result from the necessity of burring sheet material by hand.

Another important object resides in providing a burring machine comprising suitable burr removing means in combination with means for feeding sheet material containing burrs continuously to the burr removing means and presenting the sheet material to the burr removing means in a fashion causing all of the burrs in the sheet to be neatly removed or excised, regardless of the location of the burred openings in the sheet or plate, and thereafter to straighten the plate for the elimination of any warping or buckling that may have been imparted thereto as a result of the formation of holes therein.

Another important object is to provide a machine of the character mentioned, including a knife for excising burrs, in combination with roller means particularly adapted for feeding a sheet containing burrs to the knife without mashing down the burrs; a further object being to arrange the roller feed means so as to present the sheet to the burring knife so that the same may cut and thus remove the burrs along a cutting plane very slightly spaced from the surface of the sheet being treated, to thereby leave vestigial trimmed burrs of minute dimensions, and then completing the burring operation by passing the sheet to a set of rollers which flatten down such vestigial burrs left by the knife.

Another important object is to provide for adjusting the burring knife in a direction transversely of the path of travel of the sheet as determined by the sheet feeding rollers.

Another important object is to provide guide rollers in combination with a burring knife and arranged to guide a plate endwise to the knife in such a way as to insure that the end of the sheet may safely clear the knife while, thereafter, the burred surface of the sheet may be held against the knife in position to allow burr removal therefrom along a cutting plane slightly spaced from the plane of the burred surface of the sheet.

Another object is to utilize a preferably steel roller in combination with a cutting knife in order to hold the sheet being treated with its burred side against the knife in burr cutting position; a further object being to utilize a resilient roller of preferably rubber-like material immediately in advance of the cutting knife and having a resilient side extending slightly above the cutting plane of the knife whereby a sheet to be burred, in being fed edgewise to the knife, may first encounter the resilient roller and be guided over the cutting knife to prevent the same from nicking the edge of the plate.

Another important object is to utilize guide rollers having resilient sheet engaging surfaces of elastic, preferably rubber-like material for delivering sheet material to the burring knife and for retracting the sheet from the burring knife, in combination with substantially non-resilient, preferably steel rollers for gripping the opposite sides of the plate being treated to aid in drawing the sheet across the burring knife to effect the completion of the burring operation and for straightening the sheet after the burrs have been removed therefrom and prior to the delivery of the burred sheet from the machine.

Another important object is to provide adjustable means for the sheet feeding rollers whereby the apparatus may be made to accommodate sheets of various gauge or thickness.

A further object is to utilize fluid pressure or hydraulic means for controlling the adjustment of the rollers.

Another important object is to utilize resilient and also substantially non-resilient roller means for feeding sheet material through the machine, the non-resilient rollers having surfaces extending in position to engage sheet material tangentially when the same is passing through the machine, while the resilient rollers have surfaces extending inwardly of the plane defining the path of travel of the sheet material through the machine, whereby the resilient rollers slightly compress upon the sheet material and also yield to permit the passage of burrs without mashing the same as the material traverses the burring machine.

Among the other important objects the invention are the provision of an improved roller driving mechanism, which is simple yet positive in operation, to drive the various rollers at uniform speed, which is readily accessible at one end of the machine; the provision of an improved rigid, yet lightweight structure for adjustably supporting certain of the feed rollers; the provision of edge guiding rollers at opposite ends of the machine to aid in directing sheet material into the machine for processing, and outwardly of the machine at the discharge side thereof; the provision of an idler support roller to aid in feeding sheet material to the machine; the provision of simple, yet positive means for adjusting the machine for operation on sheet material of various thickness including inexpensive, yet reliable indicating means for showing the adjusted position of the machine; the provision of actuating means for effecting the vertical movement of certain of the rollers and which are adapted to maintain the rollers in true alignment in the movements thereof; the provision of a gear train arrangement for actuation of the various rollers and which are adapted to be operative even though certain of the gears are operatively moved relative to other gears when the machine is adjusted to accommodate various thicknesses; and, in general, the provision of a sturdy, easily operated and adjusted apparatus adapted for automatic operation and for supervision by relatively unskilled workers, which will process sheet material in a substantially automatic fashion and relatively rapidly for the removal of burrs from sheet material.

These and numerous other important objects, advantages, and inherent functions of the invention will become apparent as the invention is more fully understood from the following description, which, taken in conjunction with the accompanying drawings, discloses a preferred embodiment of the invention.

Referring to the drawings:

Fig. 5 is a top plan view of the apparatus shown in Fig. 1.

Fig. 6 is a front elevation view of the apparatus; and

Fig. 7 is an end view of the same.

Figure 1:
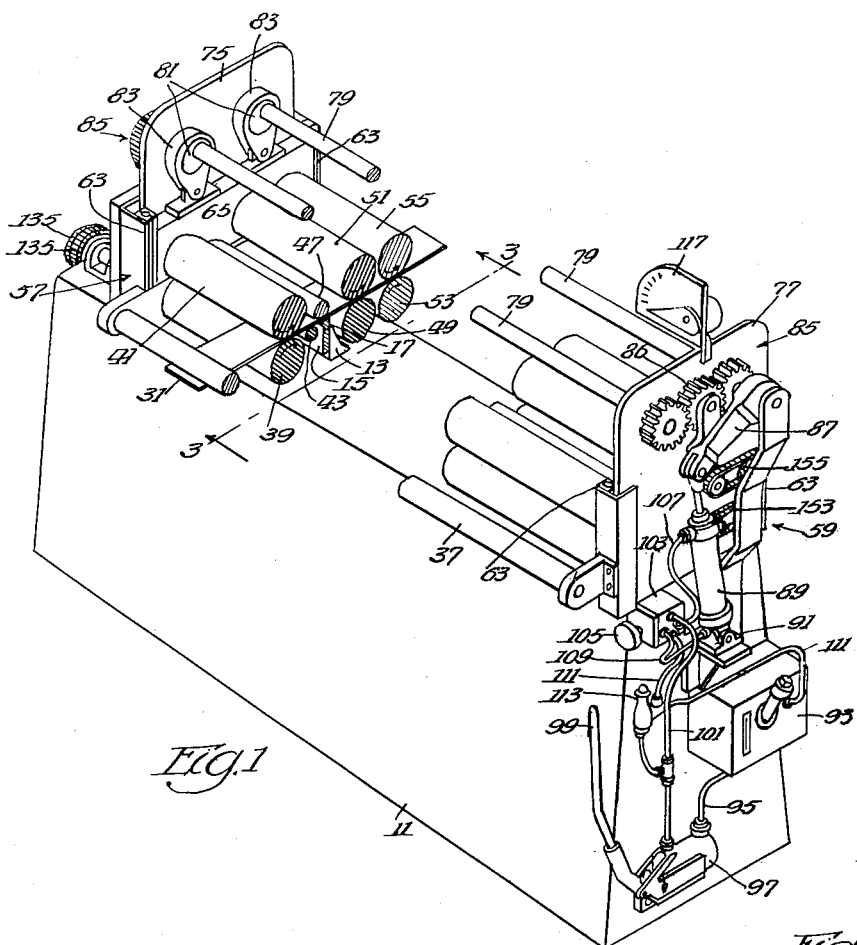
Fig. 1 is a perspective view of apparatus embodying the present invention.
Figure 2:
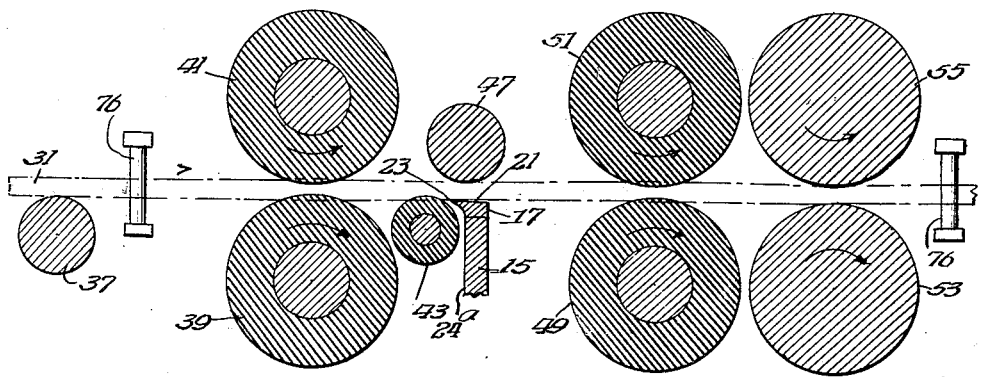
Fig. 2 is an enlarged sectional view taken through the machine to show the arrangement of the burring knife and the feeding and guiding rollers.

To illustrate the invention, the drawings show a burring machine comprising a supporting base or pedestal 11 of generally box-like construction and affording support for operating mechanism on top of the base. The burring apparatus essentially comprises a knife and roller means for feeding material to be burred across the knife to thereby slice off substantially all of the height of the burrs from the surface of the material, and additional rollers to flatten the remaining burr portions to thereby complete the burring operation. The burring knife is carried on spaced brackets 13 mounted on top of the base in position to receive and support knife mounting means 15 extending longitudinally of the base. The supporting means 15 carries preferably sectional blade means 17 forming the burring knife, said blade means preferably comprising lengths of suitable blade material, such as hardened tool steel, sintered tungsten carbide, or other preferred hard cutting material. These sections are secured to the support 15 in end to end abutting relationship, as by means of countersunk bolts 19. The knife blade sections have flat top surfaces 21 inclined at one degree from the horizontal and a cutting edge 23 at the forward edges of said top surfaces facing the side of the burring machine at which sheet material to be treated is introduced to the machine. The surfaces 21 are inclined as stated, to reduce frictional load as the material passes thereover.

The cutting edge 23 preferably comprises the intersection of the knife face 22 with the top surface 21 of the blade at an angle of from one to about twelve degrees less than a right angle. The knife surface 22 preferably makes an angle of eighty-seven degrees with a horizontal plane passing through the cutting edge 23. The knife means, however, will operate in satisfactory fashion if the surface 22 is dressed at an angle between seventy-eight degrees and ninety degrees.

Figure 4:
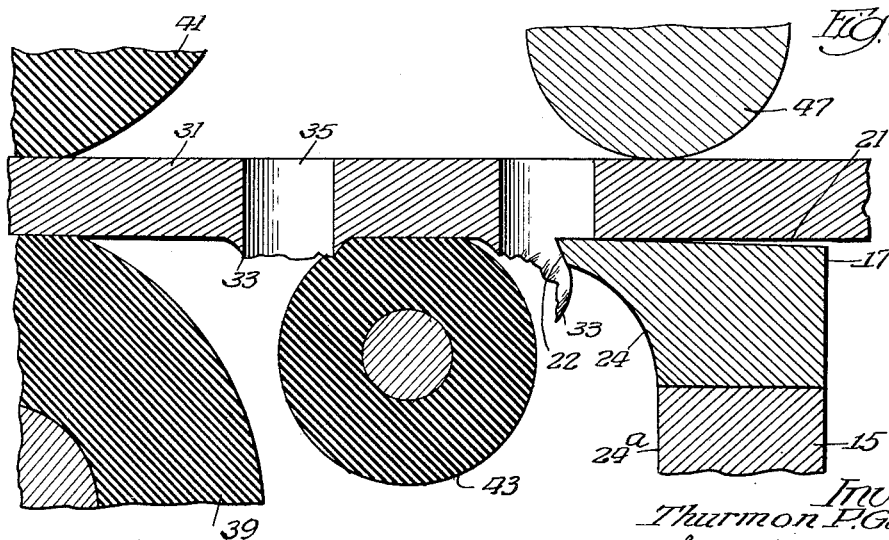
Fig. 4 is an enlarged sectional view of the burring knife and associated guide rollers.

If dressed at an angle of less than seventy-eight degrees, the possibility of injury to the knife edge is substantial, so that angles of less than seventy-eight degrees are not recommended. The knife is preferably so located relative to the burrs that substantially all of each burr, except the extreme base portions thereof, is removed by a shearing action, as indicated more particularly in Fig. 4 of the drawings, and consequently the larger the angle at the intersection of the surfaces 21 and 22, the more bearing surface is provided at the knife edge to act against the burr and a longer life is imparted to the edge. Below the knife surface 22, the forward face of the knife blade may be cut away at a relatively sharper angle, as along the curved surface 24.

The apparatus includes adjustable wedges 25 operated by threaded shafts 27 mounted in threaded brackets 29 supported at the top of the base in position to engage beneath the knife support plates 15 for the purpose of adjusting the elevation of the knife means 17, said plates 15, when in adjusted position, being secured to the brackets 13 by means of suitable clamping bolts.

Sheet material 31 to be treated, may be delivered to the machine, at one side thereof, and drawn through the machine along a predetermined path travelling across the top of the knife means 17, with the burred face of the sheet material in point contact with the upper surfaces 21 of the knife means, as will hereinafter be more fully explained. The knife means consequently will operate to cut off, for substantially all of their height, the burrs 33 formed on the knife engaging side of the sheet as a result of previous punching or drilling of holes 35 through the sheet from the opposite side thereof.

In order to advance the sheet material 31 across the knife, the machine comprises a plurality of driving and guiding rollers disposed on opposite sides of the path of travel of the sheet material through the machine. These rollers may include a preferably steel idler roller 37 at the inlet side of the machine over which the end of a sheet to be treated may be delivered. Inwardly of the idler roller is a pair of cooperating rollers 39 and 41. These rollers are located in position to receive the sheet material therebetween before it is delivered to the knife means 17 and said rollers comprise relatively thick cylinders of soft and resilient, preferably rubber-like material, said cylinders being mounted on suitable supporting cores.

It will be noted that the upper side of the idler roller 37 lies substantially in the plane of the knife edge 23 of the knife means. The rollers 39 and 41, however, are disposed between the roller 37 and the knife means and are spaced apart slightly less than the thickness or gauge of the sheet material being treated, so that the material in passing beween the rollers will cause the same to compress and grip the opposite sides of the sheet material through the resilience of the yielding surface portions of the rollers. These yielding surfaces, furthermore, are of substantial thickness so as to accommodate the burrs in passing between the rollers.

Immediately in front of the knife means 17 is a preferably sectionalized idler roller 43, the sections of which are supported at the opposite ends thereof in bearings 45 mounted at intervals on the plate 15 as by suitable holding bolts. The roller sections 43 are thus supported immediately in advance of the cutting edge of the knife means 17, the upper side of the roller 43 projecting slightly above the horizontal plane of the cutting edge 23. This arrangement is to guide, upwardly of the cutting edge of the knife, the forward or leading end of a sheet of material so that said advancing forward end may not engage the knife means but will slightly clear the same, and further to maintain the material spaced from the cutting edge several thousandths of an inch so that the cutting edge will not shear off all of the burr but will leave a height of burr that preferably is no longer than 0.002 inch. With this spacing there will be no danger that the knife will gouge or mar the surface of the material being worked. The roller means 43, however, comprises outer cylindrical portions of yielding, preferably rubber-like material mounted upon a central supporting core forming the axle of the roller means 43. Immediately above the knife means is mounted preferably steel guide roller means 47, the axis of which is disposed, behind the cutting edges of the knife and preferably in line with the forward surface 24a of the support 15, in position to engage the leading edge of the sheet material after it has passed over the cutting edge of the knife through the action of the resilient roller means 43. With the roller 47 located as stated, the pressure exerted thereby upon the material will be brought to bear at a point back of the knife edge and there will be little likelihood of the cutting edge snapping off under its pressure. The roller 47 is spaced from the top of the knife means a distance substantially equal to the gauge or thickness of the sheet material 31, and serves to hold the sheet material so that its lower or burred surface effects a point to point contact with the upper surfaces 21 of the knife means as the material travels across the knife, thereby insuring that the material is properly guided over the cutting edge and properly held so that the burrs 33 are cut off in a plane adjacent the lower surface of the sheet being treated so as to leave a vestigial burr about 0.002 inch in height.

Behind the knife means 17 and in position to receive the sheet material therebetween after the burrs have been sheared off, is a pair of rollers 49 and 51, which may be similar to the rollers 39 and 41, and mounted in spaced relationship to engage the opposite sides of the sheet material. Inwardly of the rollers 49 and 51, at the discharge side of the machine, is mounted a pair of substantially rigid, preferably steel, rollers 53 and 55, said rollers being spaced apart and positioned to tightly engage opposite sides of the sheet material and expel it at the discharge side of the machine, and at the same time perform a straightening action upon the material to eliminate therefrom any warp that may have been imparted thereto as a result of the formation of the openings 35.

In order to support the rollers, the base, at its opposite ends, is provided with a pair of upstanding wall portions forming support brackets 57 and 59 and intermediate bearing brackets 60 and 61 spaced between the end wall portions 57 and 59 for supporting the lower rollers intermediate their ends, said lower rollers 39, 49 and 53 being journaled at their ends in the wall portions 57 and 59.

The wall portions 57 and 59 are provided with upstanding supports 63 affording vertical ways in which bearing blocks 65 are guided for vertical movement, said bearing blocks 65 forming the end pieces of a rigid support frame comprising said end pieces 65, and a tubular bracing and spacing structure 69. This tubular bracing structure provides spaced bearings 71 in position vertically above the corresponding bearing brackets 61 so that the upper rollers 41, 51 and 55 may be turnably supported at their opposite ends in bearings carried by the end members 65, said rollers being journaled intermediate their ends in the bearings 71. Ball bearing means 67 may be provided in supports 63 to permit the bearing blocks 65 to move freely.

Figure 3:
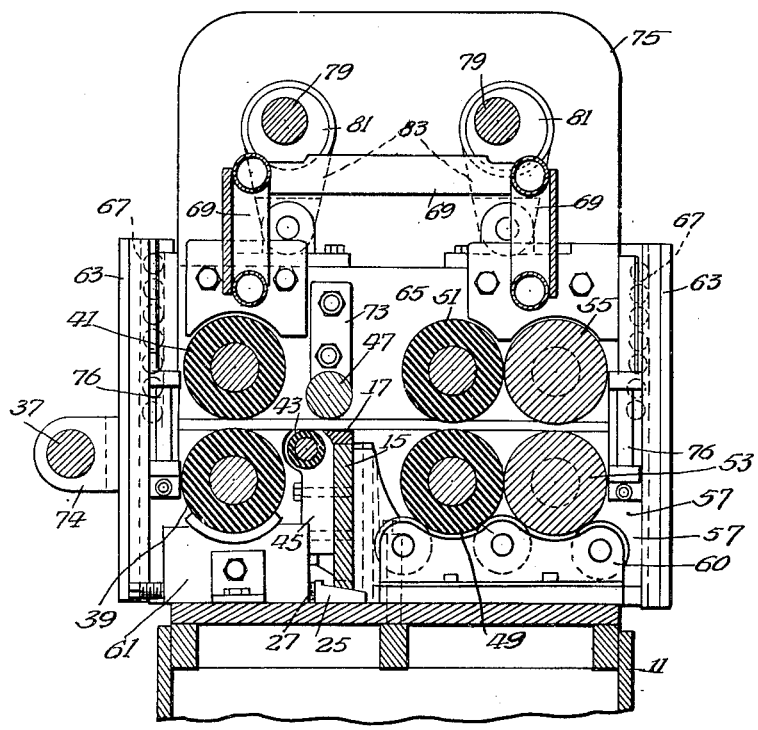
Fig. 3 is a sectional view taken substantially along line 3—3 of Fig. 1.

The sections of the idler roller 43 are supported in their bearings 45, which are mounted on the knife support means 15 opposite the brackets 13, while the roller 47 is mounted in bearing brackets 73 on the members 65 and intermediate its ends in bearings carried in the brackets 71. The idler roller 37 at the inlet side of the apparatus is journaled at its opposite ends at a suitable elevation to present sheet material, delivered there-across between the rollers 39 and 41, the roller 37 being supported in bearing brackets 74 secured to the upright channel members 63. The end wall structures 57 and 59 also support vertical guide rollers 76, as shown more particularly in Figs. 3 and 5, on opposite sides of the path of travel of the sheet material into and out of the apparatus in order to prevent the lateral edges thereof from contacting with said wall structures, and to laterally guide the sheet material in travelling through the machine.

The upper rollers 41, 51 and 55, and also the idler roller 47 may be adjusted vertically in order to accommodate material of varying thickness by adjusting the elevation of the roller support-frame work 65, 69. To this end, the end wall portions 57 and 59 are provided with vertical extensions 75 and 77 in which a pair of shafts 79 are journaled at the opposite ends thereof. The shafts 79 are formed with eccentrics 81 at the opposite ends thereof inwardly of the extension panels 75 and 77, said eccentrics being journaled within yokes 83, which depend therefrom and pivotally engage the end members 65 of the adjustable roller supporting frame. The shafts 79 have ends projecting outwardly of the panels 75 and 77 and are geared together, as shown at 85, at the opposite ends of the shaft. The opposite ends of each shaft 79 carry gears meshing with common intermediate idler gears 86, a gear 86 being turnably supported on each panel 75 and 77, and meshing each with the gears on the shafts 79. Two sets of gear assemblies 85 are provided, one at each end, to insure that all of the yokes rise in unison and at the same speed. The gears provide positive movement of the yokes and serve to prevent their misaligning. The four eccentric and yoke combinations provided one at each corner of the roller supporting framework 65, 69 act to securely lock the assembly in the various positions into which it may be moved. The eccentric and yoke combinations cooperate with the various vertical ways 63 and the ball bearings 67 to effect a true rise of the framework and rollers and insures that the rollers are held in alignment at all times. Cocking or wobbling of the framework is prevented. One of the shafts 79 is provided with an arm 87 connecting with the plunger of a hydraulic cylinder 89.

This cylinder is pivoted, as at 91, on a bracket carried by the base 11, at one end thereof. By feeding a suitable hydraulic medium into the cylinder on one side or other of its piston, the arm 87 may be raised or lowered to thereby turn the shafts 79, in unison, and thus raise or lower the roller carrying frame means 65; adjustment of the spacement of the upper and lower rollers may thus be accomplished. Obviously, other means for adjusting the rollers may be utilized and the invention is not necessarily restricted to the specific means illustrated.

Roller adjustment by the hydraulic means shown is, however, preferred since it affords an exceedingly simple, yet positive means for adjusting the rollers.

A suitable hydraulic medium for actuating the cylinder means 89 is contained in a reservoir 93 which may be conveniently mounted on and at an end of the base 11. From this reservoir the medium may be delivered through a supply pipe 95 to a preferably two-stage pump 97 adapted for manual operation by reciprocation of the handle 99 in order to force the hydraulic medium through a feed pipe 101 to a selector valve 103, which is preferably mounted on and at an end of the base 11. The selector valve has an operating handle 105 which may be set to connect the inlet pipe 101 with either of conduits 107—109 communicating with the cylinder 89 on opposite sides of the plunger to thereby either raise or lower the roller support frame 65 when the handle 99 is operated, depending upon the setting of the handle 105. The valve 103 also serves to connect the pipes 107 and 109 with a conduit 111, which leads back to the reservoir 93. A hydraulic relief valve 113 may be interconnected between the supply pipe 101 and the return pipe 111, said relief valve being set at a predetermined pressure and operates to release pressure and by-pass the hydraulic medium if the operation of the handle 99 accidentally produces an excessively high pressure in the supply pipe.

Indexing means 117 is also preferably provided to show the adjusted spacement of the rollers. Any suitable device, of course, may be utilized for indexing purposes. In the illustrated embodiment the indexing means comprises a dial and pivoted pointer 119 mounted on the top of the panel 77. The pointer is drivingly connected, as by means of a pinion on the shaft thereof, with a rack 121, which is supported for vertical sliding movement with respect to the panel 77 and which rests upon the upper edge of the end member 65 of the roller supporting frame. As the frame is adjusted vertically, such adjustment will be indicated by the relative position of the pointer 119 with respect to its cooperating scale.

The rollers 39, 49 and 53 and also the adjustable rollers 41, 51 and 55 are all drivingly interconnected and connected to a suitable driving motor 123. This motor may conveniently be, and preferably is housed within the base 11, which provides an internal mounting seat 125 for rigidly supporting the motor on the base. The motor may be controlled by switches 127 disposed in convenient position at various control stations on the frame 11 so that the motor may be started and stopped at any station. The motor 123 is preferably drivingly connected through suitable reduction gearing 129 to drive a sprocket 131 exposed outwardly of the base at one end thereof. This sprocket, in turn, is drivingly connected, as by means of chains or belts 133, with a driving gear or sprocket 135 on a counter-shaft 137. This counter-shaft 137 is journaled in a suitable bearing bracket 139 preferably disposed on the top of the base 11, at one end thereof, adjacent the roller support wall structure 57. The shaft 137 is, or may be, drivingly connected with the rollers in any suitable or preferred fashion, as by means of a sprocket 141 on the shaft 137 and a sprocket 143 on the shaft of the roller 53, said shaft extending outwardly of the wall portion 57 and having its end journaled in a suitable bracket 144 mounted on the top of the base at the end thereof. The sprockets 141 and 143 are drivingly connected as by means of a chain 145.

The shaft of the roller 53 carries a gear, which drivingly engages an idler gear 147 suitably journaled on the frame member 57. This idler gear 147 in turn drives an idler gear 149, which drivingly connects with a gear 151 on the shaft of the roller 55. The rollers 49 and 51 are driven respectively by the rollers 53 and 55, said rollers 53 and 55 respectively having pinions provided at the ends of their shafts, which extend through the opposite wall portion 59 and which pinions are connected by chains 153 and 155 to corresponding pinions on the shafts of rollers 49 and 51, also extending through wall 59.

The idler roller 147 provided on wall 57, drives a set of idler gears 157, 159 and 161, which in turn drivingly engage gears 163 and 165, respectively, on the shafts of the rollers 39 and 41. It is noted that the power to drive all six rolls 39, 41, 49, 51, 53 and 55 is all taken off of the gear carried by the shaft of roll 53. The gears provided for driving the rolls are so dimensioned that they will stay in mesh at all times even though those gears associated with the vertical movable rollers are adapted to move relative to the remaining gears when support 65 is moved to enable the machine to work a material of different thickness.

It will be seen from the foregoing that the burring machine of the present invention affords neat, compact and efficient apparatus for removing burrs, as at openings formed in sheet material. The apparatus is positive in operation, serving to receive and automatically draw sheet material endwise and present the same to the cutting knife without mashing down the burrs. The material is presented to the knife in a manner permitting the same to slice off burrs to a desired height, the machine thereafter operating automatically to eject the burred sheet therefrom after subjecting the same to a pressing operation between the rigid rollers 53 and 55. This pressing operation not only serves to straighten the material by eliminating any warping in the sheet material, but also serves to compact and thereby work-harden the vestigial burrs remaining around the openings after passing the slicing knife. Such work hardening of burr remnants makes them brittle and enables them to be easily dislodged, either while still in the machine or as a result of insertion of rivets or other fastening members therethrough, without requiring any further special burring treatment. The burrs are thus efficiently and effectively removed from the sheet material without such material being nicked, cut, gouged or otherwise marred by the cutting knife.

The machine is substantially automatic in action and may be operated by but two semi-skilled workers, one to deliver material into the machine and the other to receive the burred material at the discharge side of the machine. A team of two semi-skilled workers can easily operate the apparatus thereby substantially reducing the number of skilled and semi-skilled workers presently required for burring sheet material in accordance with existing practice.

The machine, furthermore, affords means for continuously feeding sheet material across the burring knife at a relatively rapid rate of the order of several linear feet per second, depending, of course, upon the nature of the sheet material.

The machine thus operates rapidly to accomplish its designed functions, thereby appreciably saving man-hours of work required where burring is done by hand.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. A burring machine comprising a knife, and means for delivering sheet material having burrs projecting from a burred surface thereof along a guided path past said knife, including holding means to hold the sheet material, as it passes the knife, whereby said knife will have a shearing action on said burrs, and resilient roller means disposed in advance of said knife and on the same side of the path of the material thereto, said roller having a portion normally projecting in the path of the material and serving to guide the material over said knife edge and into engagement with the said holding means, whereby to present the burrs to the knife in position to slice off the tops thereof on a shear plane spaced from the knife facing surface of the sheet material.

2. A burring machine comprising a knife, and means for delivering sheet material having burrs projecting from a burred surface thereof along a guided path past said knife, comprising driven resilient roller means including a roller adapted to frictionally grip the burred surface of the sheet material and feed it to the knife, the surface of said roller being compressible by burrs on the surface of the material engaged thereby and thus able to transfer the material to the knife without mashing down the burrs, and holding means to hold the sheet material, as it passes the knife, in position, whereby said knife will slice off said burrs.

3. A burring machine as set forth in claim 2, including a holding roller disposed in spaced relationship with respect to the knife to hold the sheet material, as it passes the knife, in position presenting the burrs to the knife at an elevation to slice off the tops thereof on a shear plane spaced from the knife facing surface of the sheet material.

4. A burring machine as set forth in claim 2, wherein said knife has a substantially flat knife surface, inclined at an angle of the order of 1 degree to the horizontal, with a knife edge formed along an edge of said surface, said knife edge being formed by the intersection of said surface with a face of the knife extending in a plane making an angle in excess of 78 degrees at said knife edge.

5. A burring machine as set forth in claim 2, wherein said knife has a substantially flat knife surface, inclined at an angle of the order of 1 degree to the horizontal, with a knife edge formed along an edge of said surface, said knife edge being formed by the intersection of said surface with a face of the knife extending in a plane making an angle of about 87 degrees at said knife edge.

6. A burring machine comprising a knife, and means for delivering sheet material, having burrs projecting from a burred surface thereof, along a guided path past said knife, comprising supporting and feeding means on a main frame or base positioned to support the burred face of the sheet material, cooperating rollers for engaging the sheet including a feed roller in advance of the knife, a holding roller at the knife for holding the material in cutting relationship with respect to the knife, and a presser roller on the discharge side of the knife, at least said holding and presser rollers being supported in a frame for adjustment on said base, whereby various thicknesses of sheet material may be accommodated in the machine, including hydraulic means for adjusting the roller carrying frame, said hydraulic means comprising a cylinder and piston combination connected to shift the frame and hold same in shifted position, fluid pressure means and manually operable valve means for directing fluid under pressure selectively to and from the cylinder to raise or lower and to hold said roller frame in adjusted position, and index means for indicating the adjusted positions of said rollers.

7. A burring machine comprising a knife, and means for delivering sheet material, having burrs projecting from a burred surface thereof, along a guided path past said knife, comprising supporting and feeding means on a main frame or base positioned to support the burred face of the sheet material, cooperating rollers for engaging the sheet including a feed roller in advance of the knife, a holding roller at the knife for holding the material in cutting relationship with respect to the knife, and a presser roller on the discharge side of the knife, at least said holding and presser rollers being supported in a frame for adjustment on said base, whereby various thicknesses of sheet material may be accommodated in the machine, including a horizontal idler roller at the inlet side of the machine over which material to be burred may be fed into the machine, and vertical edge rollers at the ends of said idler roller for guiding the lateral edges of material delivered through the machine.

8. A burring machine comprising a knife, and means for delivering sheet material, having burrs projecting from a burred surface thereof, along a guided path past said knife, comprising supporting and feeding means on a main frame or base positioned to support the burred face of the sheet material, and cooperating rollers for engaging the opposite faces of the sheet including a feed roller in advance of the knife, a holding roller, at the knife for holding the material in cutting relationship with the knife and a presser roller on the discharge side of the knife, actuating means including an assembly composed of a plurality of gear means for effecting movement of said holding roller and said pressure roller relative to said feed roller and said knife to accommodate sheet material of various thicknesses, certain of said gear means being movable relative to others of the gear assembly, said movable gear means being adapted to remain in mesh with the stationary gears of the assembly in all positions thereof.

THURMON P. GLOVER.

REFERENCES CITED

The following references are of record in the file of this patent:

UNITED STATES PATENTS

| Number | Name | Date |
|---|---|---|
| 1,058,962 | Gay | Apr. 15, 1913 |
| 1,586,100 | Meyer | May 25, 1926 |
| 1,958,103 | Kelley | May 8, 1934 |
| 1,958,146 | Kelley | May 8, 1934 |
| 1,984,737 | Gerster | Dec. 18, 1934 |
| 2,120,316 | Stone | June 14, 1938 |
| 2,153,431 | Osberg | Apr. 4, 1939 |
| 2,286,117 | Sidnell | June 9, 1942 |
| 2,348,283 | Dolan | May 9, 1944 |